Sept. 15, 1959  C. E. BERONIO  2,904,622
ELECTRIC TERMINAL UNIT
Filed July 13, 1955
FIG. 1
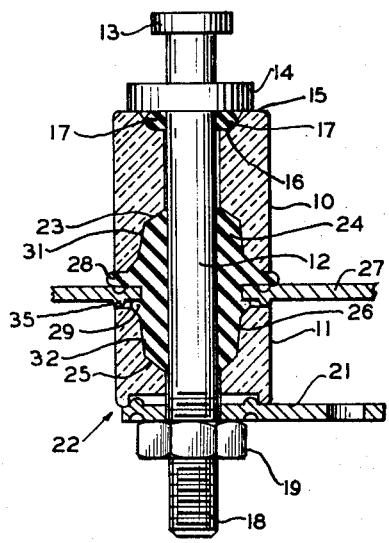
FIG. 2
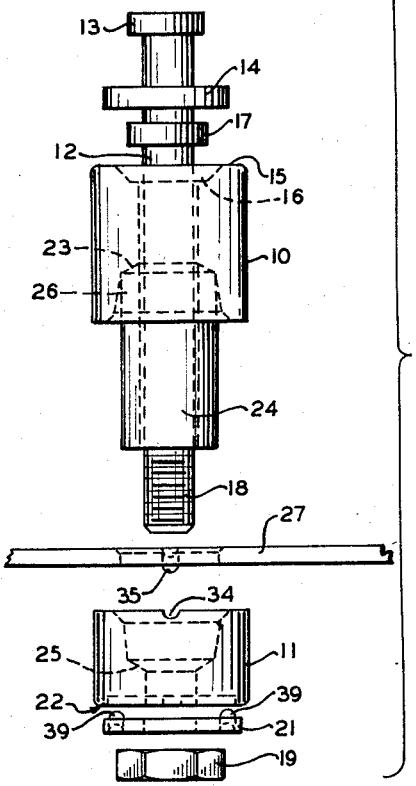
FIG. 3
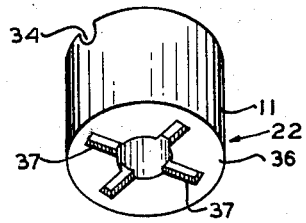
FIG. 6
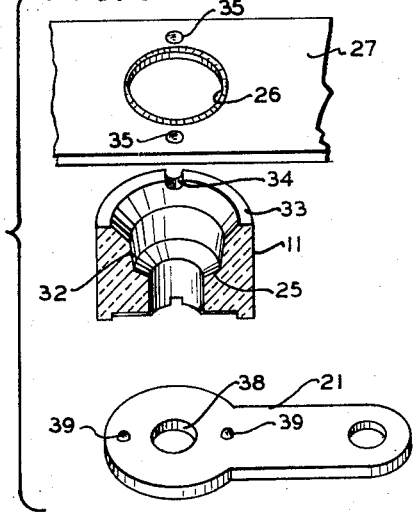
FIG. 4
FIG. 5
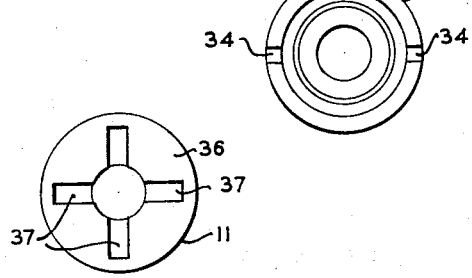
INVENTOR
CHARLES E. BERONIO
BY
ATTORNEY United States Patent Office 2,904,622
Patented Sept. 15, 1959

2,904,622

ELECTRIC TERMINAL UNIT

Charles E. Beronio, Short Hills, N.J., assignor to The Sphere Company, Inc., Little Falls, N.J., a corporation of New Jersey Application July 13, 1955, Serial No. 521,743

2 Claims. (Cl. 174—153)

This invention relates to a terminal unit including a bushing held in fixed relation to a container wall or panel to provide a water tight seal and insulation for an electrical conductor.

In my co-pending application Ser. No. 470,589, filed November 23, 1954, a terminal unit is shown and described wherein a resilient tubular member or sleeve is compressed between rigid members to reform the sleeve into a flanged seal.

The flange or flanges formed from the resilient material embrace the perimeter of a panel aperture and since the deformation of the material is the result of applied force, the contacting relation between the sleeve conductor and panel is such as to result in an hermetic seal.

Seals of the above type are in extensive commercial use in the industry and meet all the general requirements.

It has been found that when a seal is to be used under certain conditions, it is desirable to provide a simple and effective means to prevent rotary movement of the terminal portion of the unit, relative to the panel or container wall to which the unit has been applied. Means for accomplishing this fixed relation between the seal and panel have been proposed. In attempts to attain this relation, however, it has been difficult to maintain the desired simplicity of construction so essential to a seal of this type and at the same time be able to quickly produce a satisfactory seal and lock the parts against rotation in the panel aperture, without appreciably adding to the cost.

An object of the present invention is to provide a simple and practical assembly of parts to support, insulate and seal a conductor in a panel aperture and to so correlate the parts as to secure them against rotation relative to a panel or housing wall.

Another object of the invention is to provide a lead-in unit with a resilient sleeve and means for deforming the sleeve into sealing relation with a panel aperture and wherein the deforming means cooperates with a panel to secure the terminal of the unit against rotation in the aperture.

Another object of the invention is to provide a lead-in unit including a resilient member and rigid members movable to deform the resilient member into sealing relation with a panel and into fixed non-rotatable relation to said panel and in providing a terminal member maintained in fixed non-rotatable relation to the panel.

Another object of the invention is to provide a terminal unit for supporting a conductor in a panel and for locking the parts against rotation without appreciable increase in cost.

Other objects and advantages of the invention will be more clearly understood by reference to the following description together with the accompanying drawings in which:

Fig. 1 is a side elevational view of a lead-in unit assembled and in position in a panel aperture;

Fig. 2 is an exploded side elevational view of the unit ready to be applied to a panel;

Fig. 3 is a perspective view of a rigid tubular member employed in the unit assembly;

Fig. 4 is a view of one end of the member shown in Fig. 3;

Fig. 5 is a view of the other end of the member shown in Fig. 3; and,

Fig. 6 is an exploded perspective view of several parts of the unit assembly.

A lead-in unit as shown in the drawings includes a pair of adjustable rigid tubular members 10 and 11 which may be molded or otherwise formed from a suitable insulating material as porcelain or of a material known as "Teflon" which may be had in various colors.

The members 10 and 11 are movable longitudinally of a metal conductor 12 and serve as pressure members which have bores slightly greater in diameter than the diameter of the conductor and are slidable thereon.

The conductor 12 as shown in the present selected form of the unit is provided at one end with a head portion 13 in the form of a flange and an integral annular collar 14. The member 10 is provided with an annular seat 16 for a packing 17 to be engaged by flange 14 and compressed in sealing relation to conductor 12 when the unit is assembled. The packing 17 provides an additional seal and may or may not be employed.

The flange 14 at one end of the conductor 12 engages one end 15 of member 10. The other end of the conductor may be threaded to receive a nut 19. A rotation of the nut serves to engage a clip or terminal member 21 disposed between end 22 of member 11 and the nut 19.

The rigid member 10 is formed with an annular seat 23 to engage one end of a tubular resilient sleeve 24 and member 11 is formed with a seat 25 to engage the other end of sleeve 24. This sleeve or tubular member may be of rubber or other suitable pliable material and is disposed about conductor 12 between members 10 and 11.

The normal inside diameter of the sleeve 24 may be slightly less than the outside diameter of the conductor 12 to provide what may be termed a tight fit. On the other hand, since it is difficult in the commercial production of such rubber tubing to maintain an inside diameter within tolerances in the thousandths of an inch, the present unit may employ a rubber sleeve which has an inside diameter slightly greater than the diameter of the conductor to provide a sliding fit. In either case the effectiveness of the unit as a seal and insulator is satisfactory to attain the end result sought.

The normal outside diameter of sleeve 24 is slightly less than the diameter of an aperture 26 of a panel or housing wall. Thus the sleeve may be readily inserted in the panel aperture as the initial step in the assembly of the elements of the unit.

When the several parts of the unit are assembled a rotation of the nut 19 at the threaded end of conductor 12 in cooperation with flange 14 causes the members 10 and 11 to compress the sleeve 24 endwise.

When compressed endwise, the sleeve is deformed to form annular collars or beads 28 and 29 in contact with opposite surfaces of panel 27 about the perimeter of aperture 26. The sleeve ends are as stated engaged by seats 23 and 25. Seat 23 is bounded by an annular wall 31 and seat 25 is bounded by annular wall 32. These seats and surrounding walls provide pockets in which the material of the sleeve is reformed and compressed into sealing relation with the surface of conductor 12.

From the above it will be evident that the unit described includes a combination of elements as shown and described in the above mentioned co-pending application.

One practical embodiment of the present invention is shown as applied to the above described terminal unit.

Ordinarily a terminal unit as shown and described, although firmly secured to support a conductor, may under certain conditions be rotated or partially rotated relative to the panel aperture, and the terminal member moved about the axis of the conductor.

In accordance with the present invention the end surface 33 (see Fig. 6) of rigid member 11 is provided with depressions or grooves 34. The panel 27 is provided with extensions or beads 35 disposed adjacent the perimeter of aperture 26. These raised portions 35 may consist of metallic members spot welded to the panel or may, as shown, be formed from the sheet material of the panel.

When the parts are assembled, the raised portions 35 are disposed in depressions 34. When the nut 19 is rotated to bring about the sealing relation of the parts, the rigid member 11 and the panel are locked in fixed relation. It has been found that satisfactory results are obtained by providing the member 11 with two depressions or notches 34 radially disposed to receive two portions 35 integral with panel 27. The terminal end of the unit is thus held against rotary movement relative to the panel.

The terminal member 21 is also secured against rotary movement relative to the fixed rigid member 11. This is accomplished by providing the surface 36 of member 11 with a plurality of slots or grooves 37 extending radially intermediate the bore of the member 11 and its outer edge. The terminal member 21 is provided with an aperture 38 to slidably fit over conductor 18 in the usual manner to be held by nut 19. The terminal member is, however, provided with raised portions 39 so positioned as to be received in opposite radial slots 37 of member 11 when the terminal is moved into contact with member 11 by a rotation of nut 19. In accordance with well known and specified practice the nut 19 is then secured, as by soldering, to the terminal member or tab 21 and to the conductor 12.

As shown, the member 11 has four radial slots or grooves to effectively lock the terminal member 21 in either of two positions. If desired, the member 11 may be provided with a greater number of slots to permit a greater degree of adjustment of the terminal member radially with respect to the terminal unit.

From the above it will be clear that by reason of the present invention a terminal unit is provided wherein the several cooperating elements provide an effective seal and insulator, so constructed and arranged that when assembled for use the terminal section of the unit is locked in fixed relation against rotation relative to a panel or housing wall.

Although a preferred embodiment of the invention is shown and described herein, it is to be understood that modifications may be made therein without departing from the spirit and scope of the invention as set forth in the appended claims.

What is claimed is:

1. A terminal unit including a terminal tab held against relative rotary movement when the unit is supported in an aperture provided in a panel, comprising a resilient tubular member disposed in said aperture, a conductor positioned in said resilient member, said conductor having an annular collar at one end, an upper rigid tubular member surrounding said conductor and having one end in contact with an end surface of said resilient member, a lower rigid member surrounding said conductor and having an upper end surface adjacent to a surface surrounding the aperture of said panel, both of said rigid members having pockets therein flaring toward said panel and receiving and compressing said resilient member both laterally and longitudinally therein, means intermediate of said panel surface and the said upper end surface of said lower rigid member to retain said lower rigid member in fixed relation to said panel when held in compressed contacting relation therewith and thereby preventing twisting of said resilient member in use, a terminal tab disposed adjacent the lower end surface of said lower rigid member, means intermediate said lower end surface and a surface of said tab for retaining said tab against relative rotary movement when said tab and said lower rigid member are held in compressed contacting relation and means cooperating with said annular collar of the conductor to hold said tab and members in compressed relation and applying moments of force both longitudinally and radially on said resilient member and causing said resilient member to seal said unit in the aperture of said panel and retain said lower rigid member against movement relative to said panel and said tab against movement relative to said lower rigid member.

2. A terminal unit including a terminal tab held against relative rotary movement when the unit is supported in an aperture provided in a panel, comprising a resilient tubular member disposed in said aperture, a conductor positioned in said resilient member, said conductor having an annular collar at one end, an upper rigid tubular member surrounding said conductor and having one end in contact with an end surface of said resilient member, a lower rigid member surrounding said conductor and having an upper end surface adjacent to a surface surrounding the aperture of said panel, both of said rigid members having pockets therein flaring toward said panel and receiving and compressing said resilient member both laterally and longitudinally therein, a raised portion on said panel surface and a depression in the said upper end surface of said lower rigid member to receive said raised portion to retain said lower rigid member in fixed relation to said panel when held in compressed contacting relation therewith and thereby preventing twisting of said resilient member in use, a terminal tab disposed adjacent the lower end surface of said lower rigid member, a slot in said lower end surface and a raised portion on a surface of said tab for retaining said tab against relative rotary movement when said tab and said lower rigid member are held in compressed contacting relation and means cooperating with said annular collar of the conductor to hold tab and members in compressed relation and applying moments of force both longitudinally and radially on said resilient member and causing said resilient member to seal said unit in the aperture of said panel and retain said lower rigid member against movement relative to said panel and said tab against movement relative to said lower rigid member.

References Cited in the file of this patent

UNITED STATES PATENTS

| | | |
|---|---|---|
| 1,346,525 | Beetem | July 13, 1920 |
| 2,304,334 | Boucher et al. | Dec. 8, 1942 |
| 2,430,091 | Wallace | Nov. 4, 1947 |
| 2,431,951 | Mauerer | Dec. 2, 1947 |
| 2,447,489 | Clark | Aug. 24, 1948 |
| 2,555,074 | Bergan | May 29, 1951 |